Jan. 15, 1924.

F. B. LEMKE ET AL

SUPPORT FOR FLOWERPOTS

Filed June 13, 1921

1,481,137

INVENTOR
Fred B Lemke
Charles R Praeger
By Erwin Wheeler & Woolard
ATTORNEY

Patented Jan. 15, 1924.

1,481,137

UNITED STATES PATENT OFFICE.

FRED B. LEMKE, OF MILWAUKEE, AND CHARLES R. DRAEGER, OF WAUKESHA, WISCONSIN; SAID DRAEGER ASSIGNOR TO SAID LEMKE.

SUPPORT FOR FLOWERPOTS.

Application filed June 13, 1921. Serial No. 477,201.

*To all whom it may concern:*

Be it known that we, FRED B. LEMKE and CHARLES R. DRAEGER, citizens of the United States, residing at Milwaukee and Waukesha, respectively, counties of Milwaukee and Waukesha, respectively, and State of Wisconsin, have invented new and useful Improvements in Supports for Flowerpots, of which the following is a specification.

This invention relates to supports for flower pots.

In the use of jardinières, it often happens that when a flower pot is placed therein, that the height or size of the pot, in reference to that of the jardinière, is such that an inartistic result is produced. It is not expedient always to change the pots of flowers so as to have the proper relation to the jardinière, as it necessitates considerable work and also, as the pot of the particular size needed is not always at hand.

It is to provide a device supplying the above needs that this invention is designed.

Objects of this invention are to provide a support for a flower pot which is designed to be placed within jardinières; which is adjustable to accommodate pots of various heights; which is adjustable to accommodate varying diameters of pots; and in which means are provided for closing the usual hole in the bottom of flower pots, although such hole may not always be located axactly similarly in all flower pots.

Further objects are to provide a support which is neat and pleasing in appearance; which is sturdy and not likely to upset; which will securely hold a pot in the desired position; and which may be cheaply and readily manufactured.

An embodiment of the invention is shown in the accompanying drawings, in which:—

Figure 1:
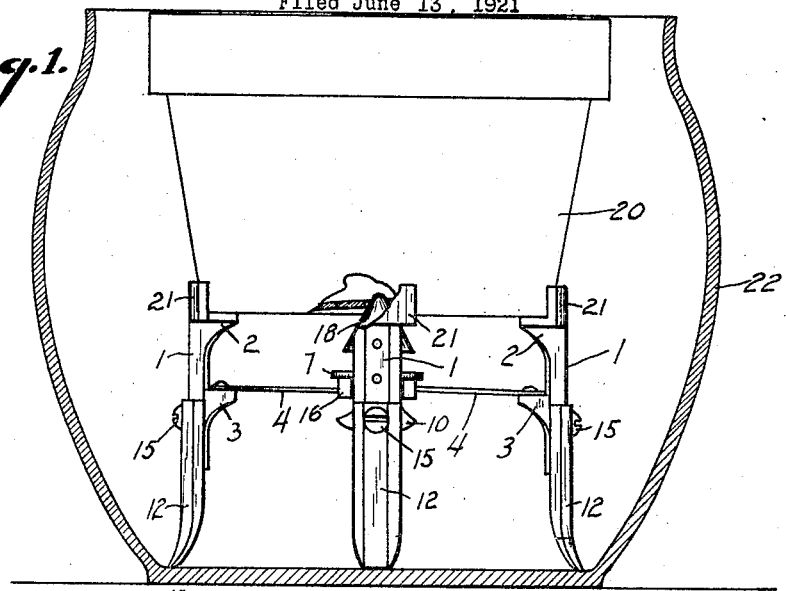
Figure 1 is a view partly in section showing the support within a jardinière and supporting a flower pot in the properly adjusted position.
Figure 2:
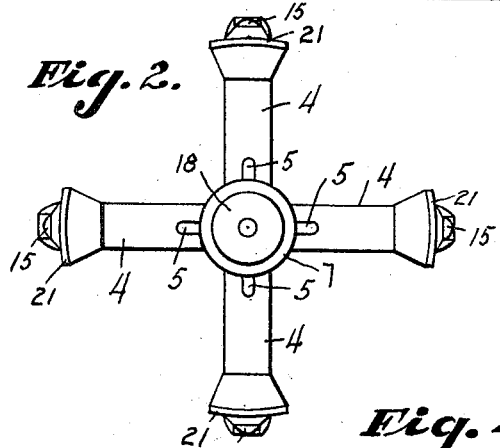
Figure 2 is a plan view of the support.

The support comprises a plurality of vertical brackets 1, each of which is provided with a pair of inwardly directed lugs 2 and 3 respectively. A radial adjusting member 4 is secured to each of the lugs 3 and extends inwardly to a central point of the support. These adjusting members are each provided with an elongated slot 5 thru which a clamping bolt 6 passes. This clamping bolt passes thru an upper washer 7 and is provided with an enlargement 8 which engages such washer and with a projection 9 extending upwardly from such enlargement for a purpose to be described later. The lower portion of this bolt is threadably engaged by wing-clamping nut or thumb nut 10 and may conveniently be provided with a washer 11.

A plurality of supporting feet or legs 12 are provided, which are channel-shaped so as to conform to the channel-shaped portion of the vertical supports 1. These legs are each provided with a hole 13 which is adapted to align with any one of a plurality of holes 14 formed in the vertical members 1. A screw-headed nut 15 is passed thru the aligning holes and securely clamps the foot in the adjusted position with respect to the vertical member. The spacing of the apertures 14, in the vertical members 1, and of the apertures 13, with reference to the bottom portion of the legs 12, is such that when each leg is similarly adjusted, the upper bracket members or lugs 2 are all in the same horizontal plane.

Figure 3:
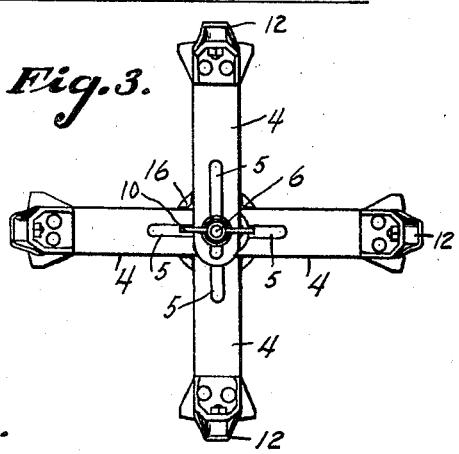
Figure 3 is a view, corresponding to Figure 2, looking from the under side of the support.
Figure 4:
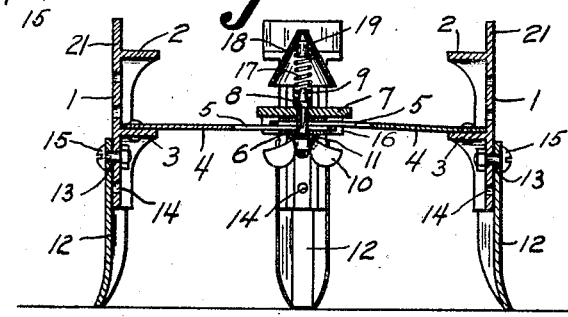
Figure 4 is a sectional elevation thru the center of the support.

The washer or central member 7 is provided with a plurality of downwardly directed lugs 16 which, it will be seen from reference to Figure 3, are positioned between the successive arms 4 and properly space such arms with reference to each other. The projection 9 of the clamping bolt 6 has a helical spring 17 secured thereto. The upper end of this spring is secured to a cone-shaped metal stopper 18 thru the medium of the plug 19.

The operation of the apparatus is as follows: When it is desired to adjust the radial members 4 to the flower pot 20, the central clamping bolt 6 is loosened by means of the thumb nut 10 and the arms are moved until the base of the flower pot rests upon the lugs 2 and its outer surface adjacent such bottom portion is clamped by means of the upwardly extending portions 21 of the vertical members 1. Thereafter, the thumb nut is tightened, thereby locking the device in position. The stopper member 18 is positioned within the bottom hole, which is usually found in flower pots, and serves to close such hole and prevent passage of dirt therethru. It is to be noted that by supporting this stopper member in the manner described, it may be moved to accommodate irregularities in the positioning of this bottom hole, as it is well known that such holes are not usually accurately positioned in the flower pot base. The resilient outward pressure exerted by the spring 17 keeps the stopper firmly seated within such hole. If it is found that the flower pot is not at the exact height necessary to secure the desired relative position of the top of the jardinière 22 and the flower, this adjustment is readily secured by aligning the proper hole 14 in each of the upright members 1 with the hole 13 of the corresponding leg 12 and thereafter, passing the bolts 15 thru such aligned holes.

Any desired material may be used in the construction of this support but it has been found that aluminum castings are especially advantageous for the vertical members, the legs, the central washer 7, and the stopper 18. Aluminum stampings may be used for the radial members 4 if desired. The aluminum stopper does not rust or tarnish, and the entire device presents a very pleasing and attractive appearance.

It will be seen that a support has been provided for flower pots which may be readily adjusted both to the diameter of the flower pot and also to properly position the flower pot with reference to the jardinière. It will also be seen that an attractive and serviceable support may be made in accordance with this invention at a very small cost.

We claim:

1. A support for flower pots having a hole in the bottom thereof, said support comprising a plurality of members for adjustably engaging the sides and bottom of said flower pot, legs adjustably related to said members for varying the height of said support, and a spring-pressed stopper for closing the hole in the bottom of said flower pot.

2. A flower pot support comprising a plurality of legs provided with pot supporting brackets, inwardly directed slotted arms carried by the legs, a clamping bolt passing through the slots of the arms and arranged to lock them in any desired relative position, and a conical stopper flexibly and resiliently supported above said bolt and adapted to close flower pot apertures of varying sizes and positions.

3. A support for a flower pot having a hole therein, said support comprising means for adjustably engaging and supporting said pot in any desired position, a stopper for closing the hole in said pot, and a spring for resiliently and yieldably pressing said stopper outwardly from said support.

FRED B. LEMKE.
CHAS. R. DRAEGER.